United States Patent
Brosten et al.

(10) Patent No.: US 9,149,773 B2
(45) Date of Patent: Oct. 6, 2015

(54) FEED NOZZLE ASSEMBLY

(75) Inventors: David Jon Brosten, Anacortes, WA (US); Ye-Mon Chen, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 265 days.

(21) Appl. No.: 13/825,928

(22) PCT Filed: Sep. 23, 2011

(86) PCT No.: PCT/EP2011/066605
§ 371 (c)(1),
(2), (4) Date: Aug. 22, 2013

(87) PCT Pub. No.: WO2012/041782
PCT Pub. Date: Apr. 5, 2012

(65) Prior Publication Data
US 2014/0145356 A1 May 29, 2014

(30) Foreign Application Priority Data
Sep. 27, 2010 (EP) .................................... 10179972

(51) Int. Cl.
| | |
|---|---|
| *B01F 3/04* | (2006.01) |
| *B01F 5/04* | (2006.01) |
| *B01F 15/00* | (2006.01) |
| *B01J 4/00* | (2006.01) |
| *B01J 8/18* | (2006.01) |
| *C10G 11/18* | (2006.01) |

(52) U.S. Cl.
CPC ........... *B01F 3/04063* (2013.01); *B01F 3/0446* (2013.01); *B01F 3/04248* (2013.01); *B01F 3/04262* (2013.01); *B01F 5/0463* (2013.01); *B01F 15/00064* (2013.01); *B01J 4/002* (2013.01); *B01J 8/1827* (2013.01); *C10G 11/18* (2013.01); *C10G 2300/40* (2013.01)

(58) Field of Classification Search
CPC .... B01F 3/04; B01F 3/04099; B01F 3/04106; B01F 3/04241; B01F 3/04248; B01F 2003/04319; B01F 2003/04361; B01F 2003/04368; B01F 3/04262; B01F 2003/04936
USPC ............................................. 261/76, 77, 78.2
See application file for complete search history.

(56) References Cited

U.S. PATENT DOCUMENTS

| | | | |
|---|---|---|---|
| 3,152,065 A * | 10/1964 | Sharp et al. | .................... 208/157 |
| 5,979,799 A | 11/1999 | Chen et al. | |
| 2002/0185552 A1 | 12/2002 | Adamson et al. | |
| 2005/0109861 A1 | 5/2005 | Chen | |

FOREIGN PATENT DOCUMENTS

| | | |
|---|---|---|
| EP | 503187 A1 * | 9/1992 |
| WO | WO9837102 | 8/1998 |
| WO | WO0040674 | 7/2000 |
| WO | WO02085501 | 10/2002 |
| WO | WO2008042078 | 4/2008 |

* cited by examiner

Primary Examiner — Robert A Hopkins

(57) ABSTRACT

A feed nozzle assembly for co-currently introducing gas and liquid into a reactor vessel which feed nozzle assembly comprises (a) an inner tube defining a gas conduit and an outer tube arranged around the inner tube, wherein the outer surface of the inner tube and the inner surface of the outer tube define an annular liquid conduit, and wherein each of the tubes have an inlet end and an opposite outlet end; (b) a first nozzle attached to the outlet end of the inner tube; (c) a second nozzle attached to the outlet end of the outer tube and arranged downstream of the first nozzle, wherein the inner tube contains purging orifices.

10 Claims, 1 Drawing Sheet

FEED NOZZLE ASSEMBLY

PRIORITY CLAIM

Figure 1:
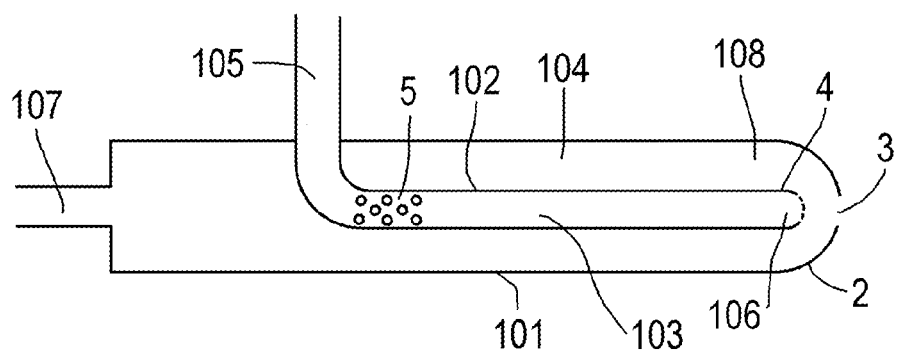

The present application claims priority from PCT/EP2011/066605, filed 23 Sep. 2011, which claims priority from European application 10179972.4, filed 27, Sep. 2010, which is incorporated herein by reference.

The invention relates to a feed nozzle for co-currently introducing a gas and a liquid into a reactor vessel, particularly for introducing steam and hydrocarbon feed into a catalytic cracking reactor.

Many oil refinery and chemical plant units utilize nozzles for distributing liquid and/or gaseous feed to the unit. In some processes, the ability of the nozzle to distribute the feed to the unit is important to the productivity of the unit. An example of such process is fluidized catalytic cracking in which large chain hydrocarbon molecules found in crude oil are cracked into smaller and more valuable commercial products such as gasoline range hydrocarbons and diesel oils with the help of catalyst. Typically, vacuum distillates are introduced through feed nozzles in an upflow riser reactor where the feed is contacted with regenerated particulate solid catalyst. The catalyst selectively aids desirable cracking reactions.

Such feed nozzle generally comprises an inner tube defining a steam conduit and an outer tube arranged around the inner tube, wherein the outer surface of the inner tube and the inner surface of the outer tube define an annular hydrocarbon conduit, and wherein each of the tubes have an inlet end and an opposite outlet end, each outlet end having a nozzle attached to its outer end. Although the catalytic cracking process generally is a long running, low cost, reliable process to operate, emergency situations may occur requiring the unit to shut down such as refinery power loss, pump failures, cooling water failure, main air blower failure and slide valve failure. If such emergency occurs, the addition of hydrocarbon feed will be stopped. However, interrupting the feed has been found to suck catalyst into the hydrocarbon conduit of the feed nozzle. This is undesirable as the catalyst tends to block the conduit due to defluidization of catalyst particles and formation of slurry. It is thought that the catalyst is sucked into the nozzle because steam flows through the gas supply nozzle without hydrocarbon feed being supplied to the annular conduit. This seems to create areas of reduced pressure inside the feed nozzle which in turn cause catalyst to be sucked into the hydrocarbon conduit.

It has been found possible to modify the feed nozzle such that catalyst particles no longer enter the feed nozzle when hydrocarbon supply is stopped while steam supply continues. Furthermore, the modification is simple and does not interfere with normal operation.

US-A-2002/0185552 describes multiple stage injection of atomizing fluid into an incoming feed material and passing the feed/atomizing fluid mixture through a nozzle. The mixing zones may completely or at least partially overlap or one zone may be completely downstream from another one so that there is no overlap between the mixing zones. The multiple mixing zones are described to create a more homogeneous fluid entering the nozzle. The gas conduits containing passage-ways are not provided with a nozzle at their downflow end.

The present invention relates to a feed nozzle assembly for co-currently introducing gas and liquid into a reactor vessel which feed nozzle assembly comprises (a) an inner tube defining a gas conduit and an outer tube arranged around the inner tube, wherein the outer surface of the inner tube and the inner surface of the outer tube define an annular liquid conduit, and wherein each of the tubes have an inlet end and an opposite outlet end;

(b) a first nozzle attached to the outlet end of the inner tube;

(c) a second nozzle attached to the outlet end of the outer tube and arranged downstream of the first nozzle, wherein the inner tube contains purging orifices.

The purging orifices are passage-ways which allow fluid to pass between the inner tube and the outer tube. Generally, the purging orifices will be apertures in the inner tube.

Figure 2:
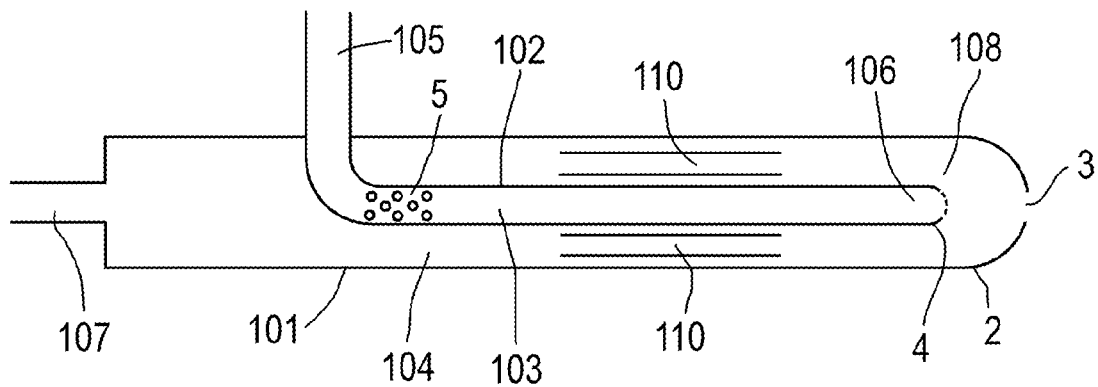

The invention will now be described by way of example in more detail with reference to the accompanying drawings, wherein FIG. 1 shows a longitudinal section of the feed nozzle assembly of the invention;

FIG. 2 shows a longitudinal section of the feed nozzle assembly of the invention further comprising partition means for keeping apart the inner and outer tubes.

FIGS. 1 and 2 show a feed nozzle assembly for introducing gas and liquid into a vessel (not shown), for example a catalytic cracking reactor. The gas preferably is dispersion gas such as steam or an inert gas such as nitrogen. Most preferably, the dispersion gas is steam. The liquid preferably is a hydrocarbon fraction, more specifically a heavy petroleum hydrocarbon. The feed nozzle assembly comprises a nozzle body having a substantially cylindrical inner tube 102 defining a gas conduit 103 and an outer tube 101 arranged around the inner tube 102, wherein the outer surface of the inner tube 102 and the inner surface of the outer tube 101 define an annular liquid conduit 104. The inner tube 102 has an inlet end 105 and an opposite outlet end 106, and the outer tube 101 has an inlet end 107 and an opposite outlet end 108. The central longitudinal axis of the inner tube 102 preferably coincides with the central longitudinal axis of the outer tube 101.

The feed nozzle assembly further comprises a first nozzle 4 fixedly attached to the outlet end 106 of the inner tube 102 and a second nozzle 2 fixedly attached to the outlet end 108 of the outer tube 101 and arranged around the first nozzle 4.

The nozzle 4 preferably has a substantially cylindrical inlet end and an opposite dome-shaped outlet end. The nozzle 4 comprises at least one passage-way for allowing gas to pass from the gas conduit to the liquid conduit and/or the second nozzle 2.

The second nozzle 2 has a substantially cylindrical inlet end attached to the outlet end of the outer tube 101 and an opposite dome-shaped outlet end provided with at least one passage-way 3. The passage-way 3 preferably is an elongated slit having substantially parallel walls. The dome-shaped outlet end of the second nozzle 2 extends beyond the dome-shaped outlet end of the first nozzle 4.

Preferably, each first nozzle 4 and second nozzle 2 contain a plurality of passage-ways.

The first nozzle 4 also is referred to as steam nozzle and preferably is provided with one or more rows of passage-ways, more specifically of from 1 to 8 rows of passage-ways, most specifically of from 1 to 6 rows. These passage-ways are also referred to as dispersion orifices. The dome-shaped outlet end of first nozzle 4 preferably has a hemi-spherical shape or a hemi-elliptical shape.

The inner tube comprises purging orifices 5. These purging orifices 5 ensure that dispersion gas flows through liquid conduit 104 in case the supply of hydrocarbon is stopped for example in case of emergency.

In order to make maximum use of the dispersion gas added, the passage-ways 5 preferably are located in the upstream half of the inner tube 102 located inside the outer tube.

The surface area of the inner tube 102 taken up by purging orifices can be relatively small such as of from 0.001 to 1% of the surface area of the inner tube in so far as this surface area is present inside the outer tube, more specifically of from 0.005 to 0.9%, more specifically of from 0.01 to 0.8%. The surface area of the inner tube taken up by purging orifices more specifically is at most 0.7%, more specifically at most 0.6%, most specifically at most 0.5%. The surface area of a passage-way or orifice is the area which allows fluid to pass i.e. the area which is open.

The ratio of surface area of all purging orifices to surface area of all first nozzle passage-ways in a single feed nozzle assembly preferably is in the range of from 0.02 to 1, more specifically of from 0.05 to 0.8, more specifically of from 0.1 to 0.7, more specifically up to 0.6 most specifically up to 0.5.

Furthermore, the surface area of each of the single purging orifices in the inner tube preferably is smaller than or equal to the surface area of the largest passage-way of the first nozzle.

It is preferred that the inner tube further comprises an inner nozzle downstream of the purging orifices but upstream of the first nozzle. This inner nozzle ensures that the pressure of the fluid in the inner tube is slightly higher near the purging offices than near the first nozzle which prevents fluid to enter the inner tube from the annular space via the purging orifices.

FIG. 2 describes a feed assembly further comprising partition means 110 for keeping apart the inner and outer tube. These partition means 110 preferably are tubes. Such tubes have the advantage that they reduce or prevent vibration of the inner tube 102. For this reason, such tubes are also referred to as muffler tubes. Muffler tubes preferably are held in place by an annular plate perpendicular to the axis of the muffler tubes which annular plate has openings accommodating the muffler tubes. The muffler tubes preferably have a diameter of from 1 to 5 cm, more preferably of from 2 to 4 cm. The number of muffler tubes preferably is of from 3 to 15, more specifically of from 3 to 12. The tubes preferably are evenly distributed along the circumference of the inner tube. The length of the tubes generally will be at most 0.5 m.

If partition means 110 are present, it is preferred that the purging orifices are present upstream of the partition means 110.

The inlet end of the inner tube generally is located at the side of the outer tube. Such side-entrance of the dispersion gas conduit into the feed nozzle assembly allows better access to the inside of the feed nozzle.

During normal operation of the feed nozzle assembly according to the present invention dispersion gas is passed through the substantially cylindrical inner tube 102 while hydrocarbon feed is supplied to the inlet end 107 of the outer tube 101 and passes through the annular liquid conduit 104.

Dispersion gas, more specifically steam, exiting the first nozzle 4 mixes with the hydrocarbon resulting in fine jets dispersing the hydrocarbon mixture. The second nozzle 2 passes the mixture of dispersion gas and hydrocarbon from the feed nozzle assembly to a vessel, preferably a fluid catalytic cracking reactor. The second nozzle 2 is adapted to substantially uniformly atomize the mixture of dispersion gas and heavy petroleum hydrocarbon.

The nozzle assembly of the present invention is especially suitable for feeding a hydrocarbon feed into a fluid catalytic cracking riser reactor which is a vessel in which hydrocarbon feed is vaporized and cracked into smaller molecules by contact and mixing with hot catalyst from a regenerator, which hot catalyst preferably has a temperature of at least 600° C. Cracked product vapors subsequently are separated from spent catalyst with the help of cyclones. The hydrocarbon feed generally is heated, preferably to a temperature of from 150 to 260° C., before being introduced into the feed nozzle and the riser reactor. In this application, the nozzles generally are used for supplying the feed from the side of the riser and are so-called side entry feed nozzles. They are preferably located on the riser circumference.

In order to provide an even distribution of the oil over the riser, it is preferred that multiple side entry feed nozzles are located on the riser circumference. A further advantage of placing the nozzles around the riser circumference is that this tends to off-set the tendency of the catalyst to migrate to the riser walls.

What is claimed is:

1. A feed nozzle assembly for co-currently introducing gas and liquid into a reactor vessel comprising:
   an inner tube defining a gas conduit and an outer tube arranged around the inner tube, wherein the outer surface of the inner tube and the inner surface of the outer tube define an annular liquid conduit, wherein each of the tubes have an inlet end and an opposite outlet end, and wherein the inner tube contains purging orifices, wherein the purging orifices occupy from 0.001 to 1% of the surface area of the inner tube located in the outer tube;
   a first nozzle attached to the outlet end of the inner tube; and
   a second nozzle attached to the outlet end of the outer tube and arranged downstream of the first nozzle.

2. A feed nozzle assembly as claimed in claim 1, wherein the feed nozzle assembly further comprises:
   partition means for keeping apart the inner tube and the outer tube.

3. A feed nozzle as claimed in claim 2, wherein the purging orifices are located upstream of the partition means.

4. A feed nozzle assembly as claimed in claim 1, wherein the purging orifices are located in the upstream half of the inner tube located in the outer tube.

5. A feed nozzle assembly as claimed in claim 1, wherein the inner tube further comprises an inner nozzle downstream of the purging orifice.

6. A feed nozzle assembly for co-currently introducing gas and liquid into a reactor vessel comprising:
   an inner tube defining a gas conduit and an outer tube arranged around the inner tube, wherein the outer surface of the inner tube and the inner surface of the outer tube define an annular liquid conduit, wherein each of the tubes have an inlet end and an opposite outlet end, and wherein the inner tube contains purging orifices;
   a first nozzle attached to the outlet end of the inner tube; and
   a second nozzle attached to the outlet end of the outer tube and arranged downstream of the first nozzle; and
   an inner nozzle downstream of the purging orifices, wherein the inner tube comprises the inner nozzle.

7. A feed nozzle assembly as claimed in claim 6, wherein the feed nozzle assembly further comprises:
   partition means for keeping apart the inner tube and the outer tube.

8. A feed nozzle as claimed in claim 7, wherein the purging orifices are located upstream of the partition means.

9. A feed nozzle assembly as claimed in claim 6, wherein the purging orifices are located in the upstream half of the inner tube located in the outer tube.

10. A feed nozzle assembly as claimed in claim 6, wherein the purging orifices occupy of from 0.001 to 1% of the surface area of the inner tube located in the outer tube.

* * * * *